US010527475B2

(12) United States Patent
Strongin et al.

(10) Patent No.: US 10,527,475 B2
(45) Date of Patent: Jan. 7, 2020

(54) CONTOURED INSERT FOR FLOW VERIFICATION

(71) Applicant: Fluid Handling LLC., Morton Grove, IL (US)

(72) Inventors: Mikhail Strongin, Northbrook, IL (US); Mrinalini Litoriya, Evanston, IL (US); Mahesh Nair, Northbrook, IL (US); Stanley P. Evans, Jr., Tinley Park, IL (US); Florin Rosca, Niles, IL (US)

(73) Assignee: Fluid Handling LLC, Morton Grove, IL (US)

( * ) Notice: Subject to any disclaimer, the term of this patent is extended or adjusted under 35 U.S.C. 154(b) by 168 days.

(21) Appl. No.: 15/173,798

(22) Filed: Jun. 6, 2016

(65) Prior Publication Data

US 2017/0023391 A1 Jan. 26, 2017

Related U.S. Application Data

(60) Provisional application No. 62/171,023, filed on Jun. 4, 2015.

(51) Int. Cl.
*G01F 1/88* (2006.01)
*G01F 1/40* (2006.01)

(52) U.S. Cl.
CPC . *G01F 1/88* (2013.01); *G01F 1/40* (2013.01)

(58) Field of Classification Search
CPC .............. G01F 1/88; G01F 1/34; G01F 1/40
USPC ...................................................... 73/861.52
See application file for complete search history.

(56) References Cited

U.S. PATENT DOCUMENTS

| 4,047,521 A | 9/1977 | Kramer et al. |
| 4,237,739 A | 12/1980 | Owen et al. |
| 4,290,314 A | 9/1981 | Geronime |
| 4,403,514 A | 9/1983 | Osborn |
| 4,604,906 A | 8/1986 | Scarpa |
| 4,926,698 A | 5/1990 | Owen |
| 4,989,456 A * | 2/1991 | Stupecky ............. A61B 5/0876 138/46 |

(Continued)

FOREIGN PATENT DOCUMENTS

| WO | 0118493 A1 | 3/2001 |
| WO | 2001018496 A2 | 3/2001 |

OTHER PUBLICATIONS

Livelli, Greg. "Flowmeter Piping Requirements How Much Straight Run is Enough?" website Sep. 26, 2010 (14 pages) (Figures 3-5). See http://www.flowcontrolnetwork.com/articles/flowmeter-piping-requirements.

(Continued)

*Primary Examiner* — Eric S McCall
*Assistant Examiner* — Timothy P Graves
(74) *Attorney, Agent, or Firm* — Ware, Fressola, Maguire & Barber LLP

(57) ABSTRACT

The present invention provides for a device or feature that incorporates a technique or means for flow measurement in a fluid flow system. By way of example, a contoured insert may be specifically calibrated to the pipe line size to ensure the desired accuracy of the flow measurement, irrespective of pipe length between the device and other fluid system components that would negatively influence other flow rate measurement devices. This in turn reduces the total number of components needed in a system.

17 Claims, 5 Drawing Sheets

(56) References Cited

U.S. PATENT DOCUMENTS

| | | | |
|---|---|---|---|
| 5,535,633 | A | 7/1996 | Kofoed et al. |
| 6,212,958 | B1 | 4/2001 | Conley |
| 6,253,625 | B1 | 7/2001 | Samuelson et al. |
| 6,672,173 | B2 | 1/2004 | Bell |
| 6,752,027 | B1 | 6/2004 | Kalinoski |
| 6,865,957 | B1 | 3/2005 | Hughes et al. |
| 6,928,884 | B1 | 8/2005 | Pearson |
| 7,127,953 | B1 | 10/2006 | Yowell et al. |
| 7,357,040 | B2 | 4/2008 | Bell et al. |
| 7,389,684 | B2 | 6/2008 | Roy et al. |
| 7,404,337 | B2 | 7/2008 | Hughes et al. |
| 7,500,405 | B2 | 3/2009 | Gongaware et al. |
| 7,681,461 | B2 | 3/2010 | Rosenbaum et al. |
| 7,921,726 | B2 | 4/2011 | Ellegood |
| 8,056,409 | B2 | 11/2011 | Steven |
| 8,286,504 | B2 | 10/2012 | Weckstrom |
| 8,387,438 | B2 | 3/2013 | Lawrence |
| 8,561,480 | B2 | 10/2013 | Lawrence |
| 8,714,028 | B2 | 5/2014 | Re et al. |
| 8,733,180 | B1 | 5/2014 | England et al. |
| 2004/0031331 | A1 | 2/2004 | Blakley et al. |
| 2006/0042399 | A1 | 3/2006 | Hughes et al. |
| 2014/0137663 | A1* | 5/2014 | Evans ............... G01F 1/40 |
| | | | 73/861.61 |
| 2014/0230541 | A1 | 8/2014 | Herold et al. |

OTHER PUBLICATIONS

Plant Engineering Magazine, Cahners Publishing Company. Nov, 21, 1984 "Flow Reference Section: Liquid Flowmeters" Nov. 21, 1984. (7 pages) (Figure 6 on p. 4; figure 8 for "wafer" flowmeter that can be spliced into piping). See http://www.omega.com/techref/flowcontrol.html.

Ryder Jr. Robert C., et al. "Measurement and computation of supersonic flow in a lobed diffuser-mixer for trapped vortex combustors". National Aeronautics and Space Administration, Glenn Research Center, Year 2002. (45 pages) (Figure 3 to Figure 8 on pp. 5-9) See http://ntrs.nasa.gov/archive/nasa/casi.ntrs.nasa.gov/20020080901.pdf.

"Differential Pressure Flowmeters," Omega, omega.com, Transaction, vol. 4, Accessed: Jun. 2015. (25 pages) (Figure 2-8 on p. 10) See http://www.omega.com/literature/transactions/volume4/t9904-07-diff.html.

Vogel, Steven. "Life in moving fluids:the physical biology of flow." Princeton University Press, 1996.(5 pages)(The paragraph on Technology in Chapter 1). See http://pup.princeton.edu/chapters/s5523.html.

Leea, Jeong-Hun, et al. "Experimental Investigation on Cross Flow of Wedge-shaped Gap in the core of Prismatic VHTR." Transactions of the Korean Nuclear Society Autumn Meeting Pyeongchang, Korea, Oct. 30-31, 2014.(5 pages) (Figure 2 on the 2nd page). See http://www.kns.org/kns_files/kns/category/32/14A-497%C0%CC%C1%A4%C8%C6.pdf.

* cited by examiner

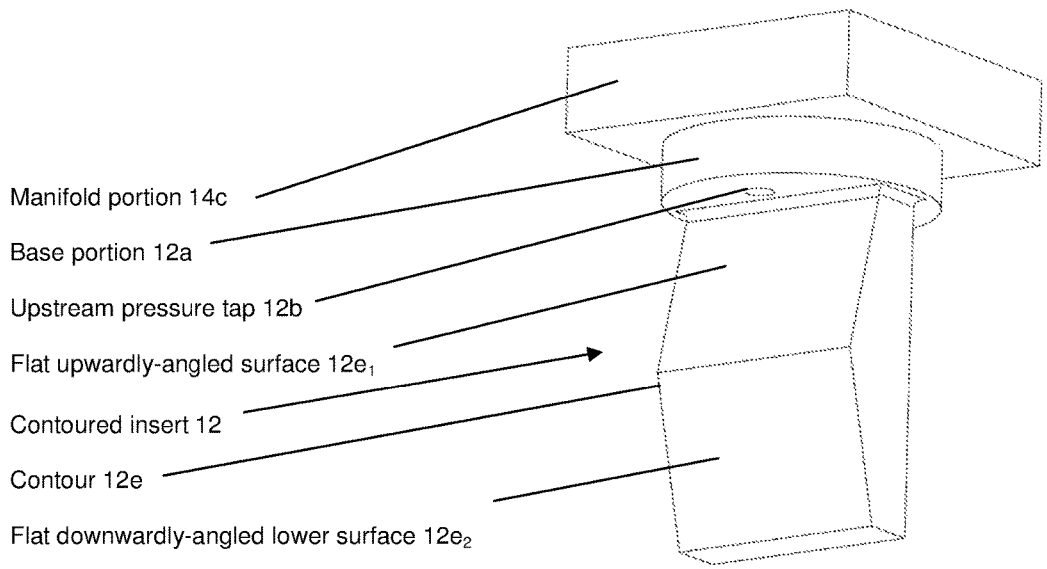
Fig. 2A
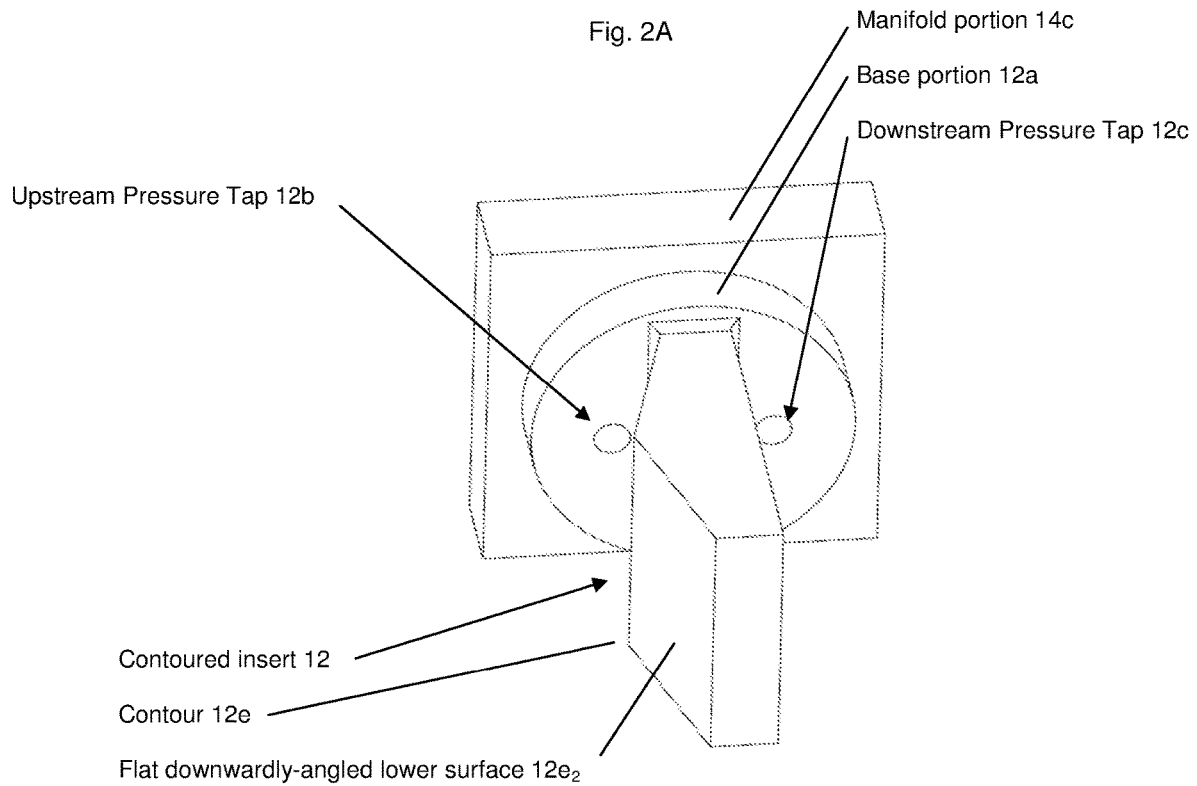
Fig. 2B
Figure 2

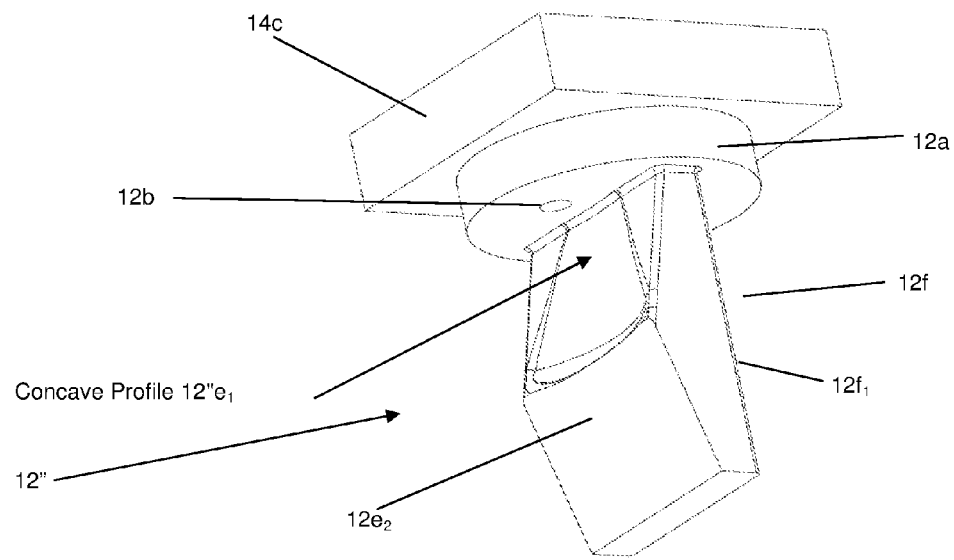
Fig. 4B(1)
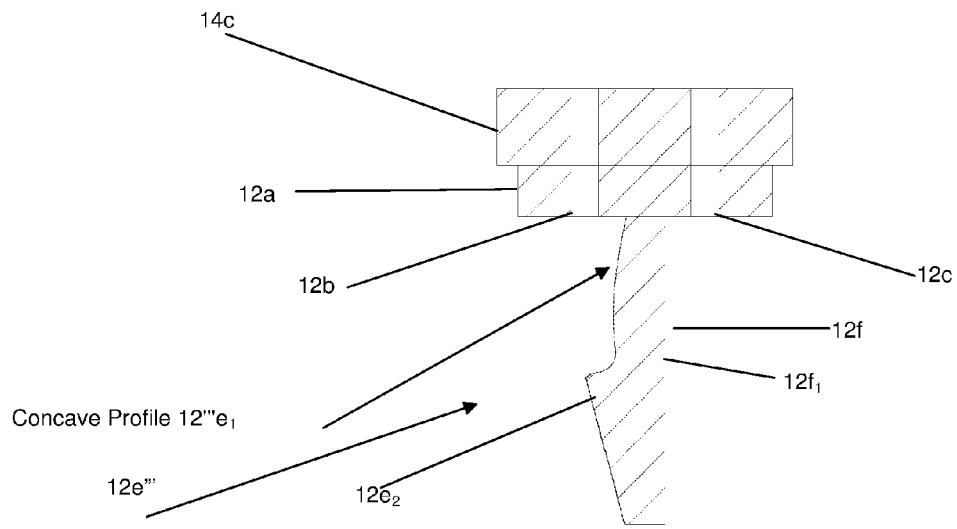
Fig. 4B(2)

Apparatus 10, including a flow measurement combination, having

> Signal processor or processing module 10a configured at least to:
>
> > receive signaling containing information about upstream and downstream pressure tap signaling containing information about upstream and downstream pressure sensed by an upstream and downstream pressure tap arrangement configured upstream and downstream in relation to a contoured insert installed at a location in a flow path of a fluid system, pre-calibrated to develop a flow coefficient that is used for verifying a volumetric flow rate in the flow path of the fluid system, and configured with a contour to create an artificial increase in an upstream pressure measurement resulting in a locally amplified pressure drop reading across the contoured insert that is directly proportional to a dynamic pressure component at the location;
>
> > determine corresponding signaling containing information about a flow measurement of the flow path in the fluid stream by applying a measured pressure differential between the upstream and downstream pressure tap signaling in relation to the flow coefficient developed by the contoured insert, based upon the signaling received; and/or
>
> > provide the corresponding upstream and downstream pressure tap signaling containing information about the flow measurement determined.

> Other signal processor circuits or components 10b that do not form part of the underlying invention, e.g., including input/output modules, one or more memory modules, data, address and control busing architecture, etc.

Figure 5: Signal Processing Functionality

CONTOURED INSERT FOR FLOW VERIFICATION

CROSS-REFERENCE TO RELATED APPLICATIONS

This application claims benefit to provisional application Ser. No. 62/171,023, filed 4 Jun. 2015, which is hereby incorporated by reference in its entirety.

BACKGROUND OF THE INVENTION

1. Field of the Invention

The present invention relates to a technique for providing flow verification, e.g., of a fluid flowing in piping; and more particularly, the present invention relates to a technique for providing such flow verification using an insert arranged in the fluid flowing.

2. Brief Description of Related Art

Presently, most systems where a fluid flows require a separate permanent flow measurement feature or device as a means of verifying the system flow rate. Typical devices or features are orifice plates, flow nozzles, pitot tubes, or venturi meters which are inserted into the fluid flow stream, either as their own device, or as a feature of a component in the fluid system, such as a valve or fitting. This presents a problem as they take up extra space and increase the head loss in pressure dependent systems. A problem also exists due to significant amounts of extra pipe length between the device and other system components (such as pumps, valves, or elbows) that may be required for those flow measurement devices to function properly and maintain accuracy, depending on the type being used. Permanent flow measurement devices in fluid flow systems are also subject to scale or suspended matter build up, which adversely affects the performance of the device and increase the head losses seen by the system.

In view of this, there is a need for a better way to determine and provide a flow measurement, e.g., of a fluid flowing in piping.

SUMMARY OF THE INVENTION

The present invention provides for a device or feature that incorporates a technique or means for flow measurement in a fluid flow system. By way of example, a contoured insert may be specifically calibrated to the pipe line size to ensure the desired accuracy of the flow measurement, irrespective of pipe length between the device and other fluid system components that would negatively influence other flow rate measurement devices. This in turn reduces the total number of components needed in a system.

This contoured insert may be installed in the flow path of a fluid system as a means of flow measurement to verify the volumetric rate of fluid flow. This contoured insert can be installed in a valve, a length of piping, or any other device in a fluid system. The contoured shape of the contoured insert also resists buildup of material that would normally collect on other types of flow measurement devices. The contoured insert is minimally invasive in the fluid flow stream and does not significantly impact the overall pressure head loss of the device into which it is assembled.

The contoured insert may be pre-calibrated to the pipe line size to develop a flow coefficient that is used for verifying the volumetric fluid flow rate of a system. The overall length and width of the insert correlates to the location within the valve, pipe, or other device in which it is used, where the fluid velocity is closest to the average velocity of the fluid flowing within. The contoured insert may also be specifically sized to minimize the impact it may have on the overall head loss of the device in which it is assembled.

Pressure taps may be located immediately upstream and downstream of the contoured insert, and will be used to determine upstream and downstream pressures, respectively. Port features in the device body will be configured to allow the pressure taps to be measured, either mechanically or electronically. Flow may be determined by applying the measured pressure differential between the upstream and downstream taps in relation to the flow coefficient of the calibrated contoured insert.

The contour of the contoured insert may be configured to create an artificial increase in the upstream pressure measurement resulting in a locally amplified pressure drop reading across the contoured insert that is directly proportional to the dynamic pressure component at that location. The ability to measure the dynamic pressure component at the upstream tap is caused by the upper portion of the contour directing the fluid flow stream towards the pressure tap. The lower portion of the contour simultaneously directs the lower flow profile section down towards the main flow path, which helps minimize the total pressure drop, or head loss, of the device. The flat downstream (back) side of the insert maintains a static pressure zone. The increased pressure differential across the upstream and downstream taps of the contoured insert eliminates the variation in measurement that may be seen with smaller pressure differences and improves the accuracy of the measurement used for determination of flow.

In an alternate embodiment, the contoured insert may be configured to feature only a contour for directing flow solely toward the upstream pressure tap.

In other embodiments, the contoured insert may be configured to feature concave or convex contours, or a combination of the concave and convex contours.

The contoured insert may also be manufactured in such a way that it is integral to the body of the valve, pipe, or other device of which it is a part.

Examples of Particular Embodiments

According to some embodiments, the present invention may take the form of apparatus, e.g., such as a flow measurement combination, comprising a contoured insert in combination with an upstream and downstream pressure tap arrangement.

The contoured insert may be configured at a location in a flow path of a fluid system, pre-calibrated to develop a flow coefficient that is used for verifying a volumetric flow rate in the flow path of the fluid system, and configured with a contour to create an artificial increase in an upstream pressure measurement resulting in a locally amplified pressure drop reading across the contoured insert that is directly proportional to a dynamic pressure component at the location.

The upstream and downstream pressure tap arrangement may be configured at the location upstream and downstream from the contoured insert to sense upstream and downstream pressure of the flow path in the fluid stream, and provide upstream and downstream pressure tap signaling containing information about the upstream and downstream pressure sensed for further processing to determine a flow measurement of the flow path in the fluid stream by applying a measured pressure differential between the upstream and downstream pressure tap signaling in relation to the flow coefficient developed by the contoured insert.

The present invention may include one or more of the following additional features:

The upstream and downstream pressure tap arrangement may be configured with an upstream pressure sensor; the contour insert may include a base portion configured with an upstream pressure tap formed therein; and the contour may be configured with an upstream contour portion having a flat upwardly-angled surface configured to direct a fluid flow stream towards the upstream pressure tap for sensing by the upstream pressure sensor of the upstream pressure tap arrangement and cause a dynamic upstream pressure component; and a flat downwardly-angled lower surface configured to simultaneously direct a lower flow profile section down towards a main flow path, which minimizes a total pressure drop, or head loss, of the flow measurement combination.

The upstream and downstream pressure tap arrangement may be configured with a downstream pressure sensor; and the base portion may be configured with a downstream pressure tap formed therein; and the contour may be configured with a downstream contour portion having a flat backside configured to maintain a static pressure zone downstream of the contoured insert.

The contour insert may include a base portion configured with an upstream pressure tap and a downstream pressure tap, both formed therein.

The contour may be configured as a flat angled surface extending from a base portion of the contoured insert.

The contour may include an upstream curved contour portion configured with either a concave-shaped surface, or convex-shaped surface, or a combination thereof.

The contoured insert and the upstream and downstream pressure tap arrangement may be manufactured so as to be integral to a body of a valve or pipe.

The contoured insert may include a base portion having the contour extending therefrom, e.g., into the piping, and also having upstream and downstream pressure taps configured or formed therein in relation to the contour; and the upstream and downstream pressure tap arrangement may include upstream and downstream tap sensors configured to sense fluid pressure in relation to the upstream and downstream pressure taps and provide the upstream and downstream pressure tap signaling.

According to some embodiments, the present invention may include, or take the form of, apparatus featuring a signal processor or signal processing module configured to receive upstream and downstream pressure tap signaling containing information about upstream and downstream pressure sensed by an upstream and downstream pressure tap arrangement configured upstream and downstream in relation to a contoured insert installed at a location in a flow path of a fluid system, pre-calibrated to develop a flow coefficient that is used for verifying a volumetric flow rate in the flow path of the fluid system, and configured with a contour to create an artificial increase in an upstream pressure measurement resulting in a locally amplified pressure drop reading across the contoured insert that is directly proportional to a dynamic pressure component at the location; and determine corresponding signaling containing information about a flow measurement of the flow path in the fluid stream by applying a measured pressure differential between the upstream and downstream pressure tap signaling in relation to the flow coefficient developed by the contoured insert, based at least partly upon the upstream and downstream pressure tap signaling received.

The apparatus may include either the contoured insert installed at the location in the flow path of the fluid system, or the upstream and downstream pressure tap arrangement configured upstream and downstream in relation to the contoured insert, or both.

According to some embodiments, the apparatus may include the flow measurement combination together with the signal processor or signal processing module. This combination may also include one or more of the features set forth herein.

BRIEF DESCRIPTION OF THE DRAWING

The drawing includes the following Figures, not drawn to scale:

FIG. 2 includes FIGS. 2A and 2B showing perspective views of a contoured insert that forms part of the flow measurement combination shown in FIG. 1, according to some embodiments of the present invention.

FIGS. 4B(1) and 4B(2) are diagrams of contoured inserts having concave and/or convex profiles, according to some embodiments of the present invention.

FIG. 5 shows a block diagram of apparatus having a signal processor or signal processing module for implementing signal processing functionality, according to some embodiments of the present invention.

Figure 1:
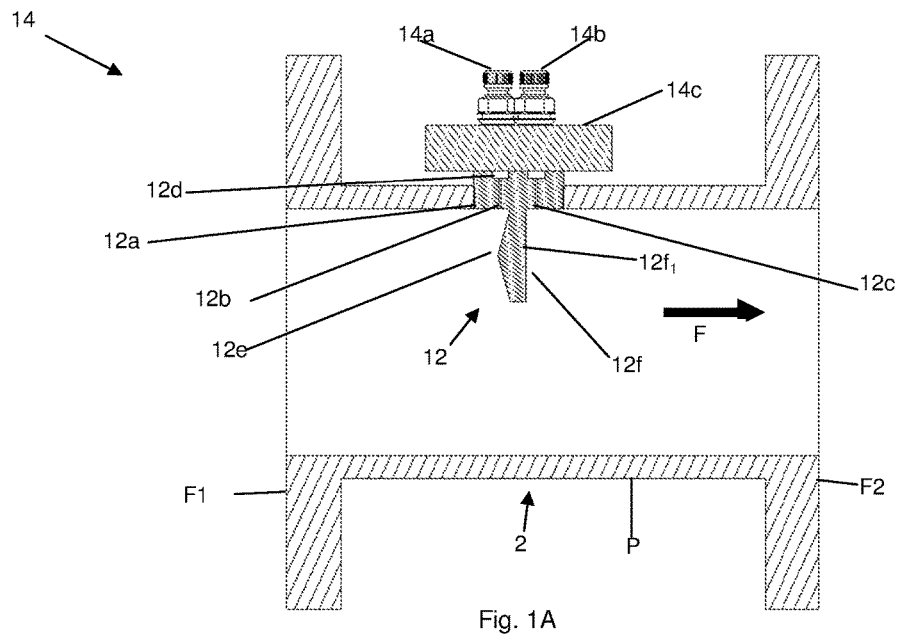
FIG. 1 includes FIGS. 1A and 1B showing cross-sectional views of piping having a flow measurement combination, according to some embodiments of the present invention.
Figure 1:
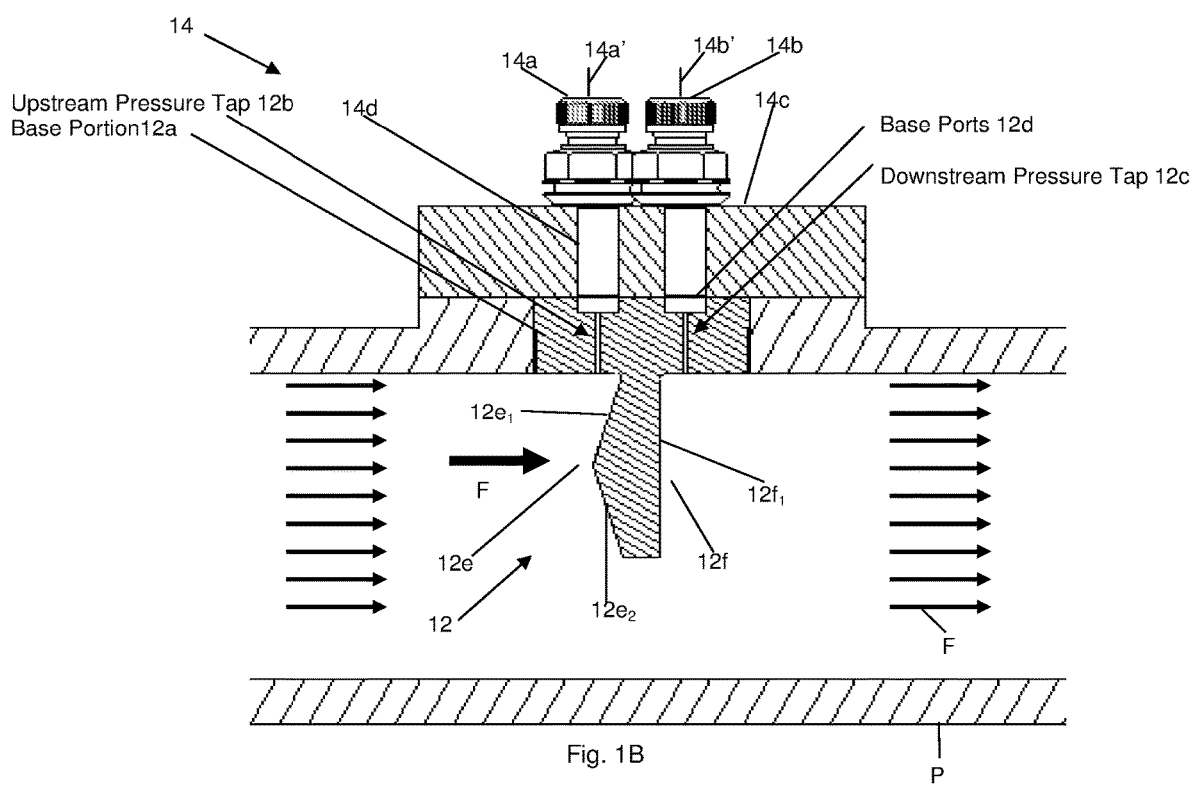

The Figures include reference numerals and lead lines, which are included to describe each Figure in detail below. In the drawing, similar elements in the various Figures are labeled with similar reference numerals and lead lines. Moreover, not every element is labeled with a reference numeral and lead line in every Figure to reduce clutter in the drawing as a whole.

DETAILED DESCRIPTION OF THE INVENTION

FIGS. 1-4

FIG. 1 shows an example of piping P having apparatus generally indicated as 10 (see FIG. 5) that may include, or take the form of, a flow measurement combination, according to some embodiments of the present invention. FIG. 1A shows the piping P configured with flanges F1 and F1, while FIG. 1B does not show the flanges. According to some embodiments, the flow measurement combination 10 may include a contoured insert generally indicated as 12 in combination with an upstream and downstream pressure tap arrangement generally indicated as 14. According to some embodiments, the apparatus may also include, or take the form of, a signal processor or signal processing module 10a shown in FIG. 5 alone, or in combination with the flow measurement combination.

In FIG. 1, the contoured insert 12 may include a base portion 12a configured with an upstream tap 12b and a downstream tap 12c therein. By way of example, the upstream tap 12b and the downstream tap 12c may be formed in the base 12a, e.g., by a molding process, by drilling, etc. The scope of the invention is not intended to be limited to any particular implementation for forming the base portion 12a with the upstream tap 12b and the downstream tap 12c. The base portion 12a may also be configured with base ports 12d, e.g., which may be formed in the base portion 12a, e.g., by a molding process, by drilling, etc.

The upstream and downstream pressure tap arrangement 14 may include at least some combination of an upstream pressure tap sensor 14a, a downstream pressure tap sensor 14b and a pressure tap manifold portion 14c. The pressure tap manifold portion 14c may be configured or formed with pressure tap ports, one of which is identified by reference label 4d, to couple the upstream pressure tap sensor 14a and the downstream pressure tap sensor 14b to the upstream tap 12b and the downstream tap 12c. Pressure tap sensors like elements 14a, 14b, e.g., configured to sense fluidic pressure, and provide sensed pressure tap signaling containing information about the same, are known in the art, and the scope of the invention is not intended to be limited to any particular type or kind thereof either now known or later developed in the future.

By way of example, the contoured insert 12 may be configured at a location generally indicated as L in a flow path F of a fluid system, e.g., shown either in the form of the piping P itself, or of which the piping P itself forms a part thereof. The contoured insert 12 may be pre-calibrated to develop a flow coefficient that may be used for verifying a volumetric flow rate in the flow path F of the fluid system. The contoured insert 12 may be configured with a contour generally indicated as 12e to create an artificial increase in an upstream pressure measurement resulting in a locally amplified pressure drop reading across the contoured insert 12 that is directly proportional to a dynamic pressure component at the location L.

In FIG. 1, the upstream tap 12b and the downstream tap 12c may be configured to provide upstream and downstream fluid to the upstream tap sensor 14a and the downstream tap sensor 14b via the pressure tap manifold portion 14c. The upstream tap sensor 14a and the downstream tap sensor 14b of the upstream and downstream pressure tap arrangement 14 may be configured at the location L upstream and downstream from the contoured insert 12 to sense upstream and downstream pressure of the flow path F in the fluid stream, and provide upstream and downstream pressure tap signaling along lines 14a', 14b' containing information about the upstream and downstream pressure sensed for further processing to determine a flow measurement of the flow path in the fluid stream by applying a measured pressure differential between the upstream and downstream pressure tap signaling in relation to the flow coefficient of the contoured insert that is pre-calibrated. In operation, and by way of example, the signal processor 10a may be configured to receive signaling that may include, or take the form of the upstream and downstream pressure tap signaling, and determine the flow measurement of the flow path in the fluid stream by applying the measured pressure differential between the upstream and downstream pressure tap signaling in relation to the flow coefficient of the calibrated contoured insert, e.g., using a signal processing algorithm consistent with that set forth herein.

Figure 3:
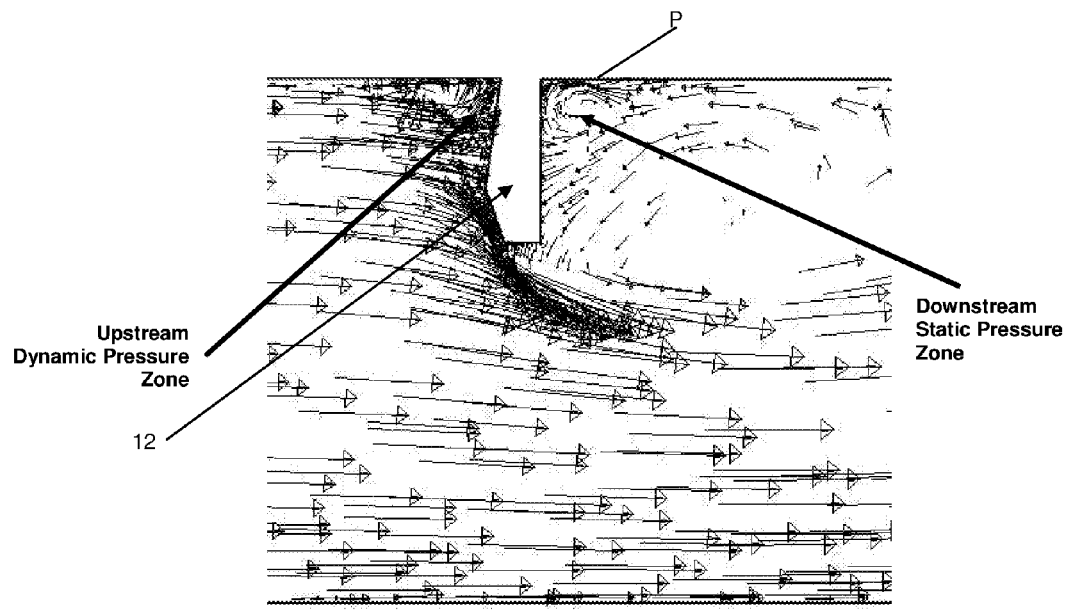
FIG. 3 is a diagram of a flow simulation in piping having a fluid flow indicated by a multiplicity of arrows having an upstream dynamic pressure zone and a downstream static pressure zone, all in relation to a contoured insert arranged in the piping, according to some embodiments of the present invention.

By way of example, the contour 12e may include, or take the form of, an upstream contour portion having a flat upwardly-angled surface $12e_1$ in combination with a flat downwardly-angled lower surface $12e_2$. The flat upwardly-angled surface $12e_1$ may be configured to direct a fluid flow stream towards the upstream pressure tap 12b for sensing by the upstream pressure sensor 14a of the upstream pressure tap arrangement 14 and cause a dynamic upstream pressure component, e.g., that may be sensed by upstream pressure tap sensor 14a. The flat downwardly-angled lower surface $12e_2$ may be configured to simultaneously direct a lower flow profile section down towards a main flow path, which helps minimize a total pressure drop, or head loss, of the flow measurement combination. By way of example, FIG. 3 shows a diagram of a flow simulation having an upstream dynamic pressure zone caused by the contoured insert 12 having the contour 12e with the flat upwardly-angled surface $12e_1$ and the flat downwardly-angled lower surface $12e_2$, according to the present invention.

The contour insert 12 may also include a downstream contour portion 12f having a flat backside $12f_1$ configured to maintain a static pressure zone downstream of the contoured insert 12. By way of example, the flow simulation in FIG. 3 also shows a downstream static pressure zone caused by the contoured insert 12 having the downstream contour portion 12f having the flat backside $12f_1$, according to the present invention.

By way of example, the contoured insert 12 and the upstream and downstream pressure tap arrangement 14 may be manufactured so as to be separate components adapted in relation to the piping P, as shown, as well as to be integral to a body of a valve or such piping P.

Flat angled surfaces like that configured or formed as element $12e_1$ or $12e_2$ in FIGS. 1 and 2 are known in the art, and the scope of the invention is not intended to be limited to any particular type or kind thereof either now known or later developed in the future. In view of that, the scope of the invention is not intended to be limited to any particular type or kind of flat surface or angled surface either now known or later developed in the future. In other word, embodiments are envisioned, and the scope of the invention is intended to include, using other types or kinds of flat surface or angled surface either now known or later developed in the future within the spirit of the underlying invention, e.g., including flat angled surfaces with or without texture, or flat angled surfaces having an angle slightly greater than or slightly less than that shown in FIGS. 1 and 2.

Figure 4A:
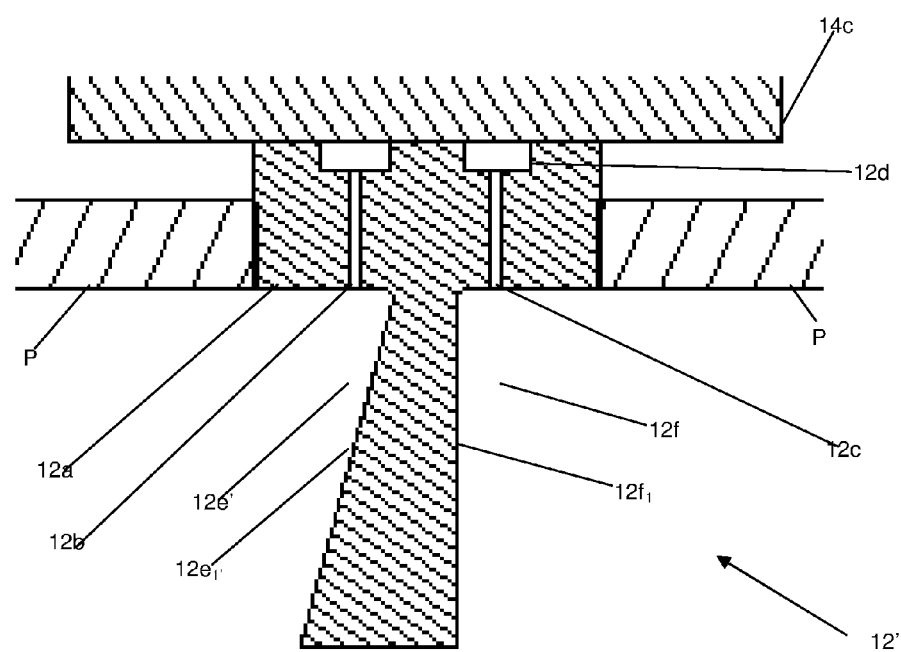
FIG. 4A is a diagram of a contoured insert for directing flow solely towards an upstream tap, according to some embodiments of the present invention.

FIGS. 4A to 4B(2)

FIGS. 4A, 4B(1) and 4B(2) show alternative embodiments of the contour and the contour insert, according to the present invention.

For example, FIG. 4A shows a contour insert generally indicated 12' that may include an upstream contour portion 12e' configured as a flat upwardly-angled surface $12e'_1$ to direct flow solely toward an upstream pressure tap of an upstream pressure tap arrangement that forms part of the upstream and downstream pressure tap arrangement. The contour insert 12' includes other features that are consistent with the contoured insert 12 shown in FIGS. 1-2 that are similarly labeled. Flat angled surfaces like that configured or formed as element $12e'_1$ in FIG. 4A are known in the art, and the scope of the invention is not intended to be limited to any particular type or kind thereof either now known or later developed in the future. In view of that, the scope of the invention is not intended to be limited to any particular type or kind of flat surface or angled surface either now known or later developed in the future. In other word, embodiments are envisioned, and the scope of the invention is intended to include, using other types or kinds of flat surface or angled surface either now known or later developed in the future within the spirit of the underlying invention, e.g., including flat angled surfaces with or without texture, or flat angled surfaces having an angle slightly greater than or slightly less than that shown in FIG. 4A.

As a further example, FIG. 4B(1) shows a contour insert generally indicated as 12″ that may include an upstream curved contour portion 12″$e$ having a concave profile 12″$e_1$ configured or formed with a concave-shaped surface. The contour insert 12″ includes other features that are consistent with the contoured insert 12 shown in FIGS. 1-2 that are similarly labeled. Concave profiles and concave-shaped surfaces like that configured or formed as element 12″$e_1$ in FIG. 4B(1) are known in the art, and the scope of the invention is not intended to be limited to any particular type or kind thereof either now known or later developed in the future. In view of that, the scope of the invention is not intended to be limited to any particular type or kind of concave profile and concave-shaped surface either now known or later developed in the future. In other word, embodiments are envisioned, and the scope of the invention is intended to include, using other types or kinds of concave profiles or concave-shaped surface either now known or later developed in the future within the spirit of the underlying invention.

As still a further example, FIG. 4B(2) shows a contour insert generally indicated as 12″ that may include an upstream curved contour portion 12″$e$ having a convex profile 12‴$e_1$ configured or formed with a convex-shaped surface. The contour insert 12″ includes other features that are consistent with the contoured insert 12 shown in FIGS. 1-2 that are similarly labeled. Convex profiles and convex-shaped surfaces like that configured or formed as element 12″$e_1$ in FIG. 4B(2) are known in the art, and the scope of the invention is not intended to be limited to any particular type or kind thereof either now known or later developed in the future. In view of that, the scope of the invention is not intended to be limited to any particular type or kind of convex profile and convex-shaped surface either now known or later developed in the future. In other word, embodiments are envisioned, and the scope of the invention is intended to include, using other types or kinds of convex profiles or convex-shaped surface either now known or later developed in the future within the spirit of the underlying invention.

FIG. 5: Signal Processor 10a

According to the present invention, the apparatus 10 may also include a signal processor or signal processing module 10a shown in FIG. 5 that may be configured to:

receive upstream and downstream pressure tap signaling containing information about upstream and downstream pressure sensed by an upstream and downstream pressure tap arrangement configured upstream and downstream in relation to a contoured insert installed at a location in a flow path of a fluid system, pre-calibrated to develop a flow coefficient that is used for verifying a volumetric flow rate in the flow path of the fluid system, and configured with a contour to create an artificial increase in an upstream pressure measurement resulting in a locally amplified pressure drop reading across the contoured insert that is directly proportional to a dynamic pressure component at the location; and determine corresponding signaling containing information about a flow measurement of the flow path in the fluid stream by applying a measured pressure differential between the upstream and downstream pressure tap signaling in relation to the flow coefficient of the calibrated contoured insert, based at least partly upon the upstream and downstream pressure tap signaling received.

The signal processor 10a may also be configured to provide the corresponding signaling containing information about the direct flow measurement of the fluid flow determined.

The signal processor 10a may also be configured with a processor and at least one memory device including computer program code, the at least one memory device and the computer program code configured to, with the at least one processor, cause the signal processor at least to implement the signal processing functionality of the apparatus set forth above. One skilled in the art would understand and appreciate how to implement such a signal processor to perform the aforementioned signal processing functionality without undue experimentation.

By way of example, the functionality of the signal processor 10a may be implemented using hardware, software, firmware, or a combination thereof. In a typical software implementation, the signal processor 10a would include one or more microprocessor-based architectures having at least one microprocessor, random access memory (RAM), read only memory (ROM), input/output devices and control, and data and address buses connecting the same. One skilled in the art would be able to program such a microcontroller (or microprocessor)-based implementation to perform the functionality described herein without undue experimentation. The scope of the invention is not intended to be limited to any particular implementation using technology either now known or later developed in the future.

The apparatus may also include other signal processing circuitas or components 10b that do not form part of the underlying invention, e.g., including input/output modules, one or more memory modules, data, address and control busing architecture, etc.

Signal Processing Algorithms

Signal processing algorithms for processing upstream and downstream pressure tap signaling, e.g. from upstream and downstream pressure tap sensed signaling, are known in the art. One skilled in the art would appreciate and be able to adapt such known signal processing algorithms to implement and determine a flow measurement of a flow path in a fluid stream by applying a measured pressure differential between upstream and downstream pressure tap signaling in relation to a flow coefficient a calibrated contoured insert, e.g., consistent with that set forth herein, and without undue experimentation. By way of example, FIG. 3 shows an example of such a fluid simulation that may be modeled mathematically for such a fluid flow indicated by such a multiplicity of arrows indicating such an upstream dynamic pressure zone and such a downstream static pressure zone, all in relation to such a contoured insert like element 12 according to the present invention.

THE SCOPE OF THE INVENTION

It should be understood that, unless stated otherwise herein, any of the features, characteristics, alternatives or

What we claim is:

1. A flow measurement combination comprising:
a contoured insert configured at a location in a flow path of a fluid system, pre-calibrated to develop a flow coefficient that is used for verifying a volumetric flow rate in the flow path of the fluid system, and configured with a contour to create an artificial increase in an upstream pressure measurement resulting in a locally amplified pressure drop reading across the contoured insert that is directly proportional to a dynamic pressure component at the location; and
an u stream and downstream pressure tap arrangement configured at the location upstream and downstream from the contoured insert to sense upstream and downstream pressure of the flow path in the fluid stream, and provide upstream and downstream pressure tap signaling containing information about the upstream and downstream pressure sensed for further processing to determine a flow measurement of the flow path in the fluid stream by applying a measured pressure differential between the upstream and downstream pressure tap signaling in relation to the flow coefficient developed by the contoured insert,
wherein
the upstream and downstream pressure tap arrangement is configured with an upstream pressure sensor;
the contour insert comprises a base portion configured with an upstream pressure tap formed therein; and
the contour is configured with an upstream contour portion having
a flat upwardly-angled surface configured to direct a fluid flow stream towards the upstream pressure tap for sensing by the upstream pressure sensor of the upstream pressure tap arrangement and cause a dynamic upstream pressure component; and
a flat downwardly-angled lower surface configured to simultaneously direct a lower flow profile section down towards a main flow path, which minimize a total pressure drop, or head loss, of the flow measurement combination.

2. A flow measurement combination according to claim 1, wherein
the upstream and downstream pressure tap arrangement is configured with a downstream pressure sensor; and
the base portion is configured with a downstream pressure tap formed therein; and
the contour is configured with a downstream contour portion having a flat backside configured to maintain a static pressure zone downstream of the contoured insert.

3. A flow measurement combination according to claim 1, the base portion is configured with an upstream pressure tap and a downstream pressure tap, both formed therein.

4. A flow measurement combination according to claim 1, wherein the fluid system includes a pipe line, and the contour is specifically calibrated to the size of the pipe line.

5. A flow measurement combination according to claim 1, wherein the contour comprises an upstream curved contour portion configured with either a concave-shaped surface, or convex-shaped surface, or a combination thereof.

6. A flow measurement combination according to claim 1, wherein the contoured insert and the upstream and downstream pressure tap arrangement is manufactured so as to be integral to a body of a valve or pipe.

7. A flow measurement combination according to claim 1, wherein
the base portion includes upstream and downstream pressure taps configured therein relation to the contour; and
the upstream and downstream pressure tap arrangement comprises upstream and downstream tap sensors configured to sense fluid pressure in relation to the upstream and downstream pressure taps and provide the upstream and downstream pressure tap signaling.

8. A flow measurement combination according to claim 1, wherein the flow measurement combination comprises a signal processor configured to receive the upstream and downstream pressure tap signaling, and determine the flow measurement of the flow path in the fluid stream by applying the measured pressure differential between upstream and downstream pressure tap signaling in relation to the flow coefficient of the contoured insert.

9. A flow measurement combination according to claim 1, wherein the contoured insert is installed in a valve or a length of piping in the fluid system.

10. A flow measurement combination comprising:
a contoured insert configured at a location in a flow path of a fluid system, pre-calibrated to develop a flow coefficient that is used for verifying a volumetric flow rate in the flow path of the fluid system, and configured with a contour to create an artificial increase in an upstream pressure measurement resulting in a locally amplified pressure drop reading across the contoured insert that is directly proportional to a dynamic pressure component at the location;
an upstream and downstream pressure tap arrangement configured at the location upstream and downstream from the contoured insert to sense upstream and downstream pressure of the flow path in the fluid stream, and provide upstream and downstream pressure tap signaling containing information about the upstream and downstream pressure sensed; and
a signal processor configured to receive the upstream and downstream pressure tap signaling, and determine corresponding signaling containing information about a flow measurement of the flow path in the fluid stream by applying a measured pressure differential between the upstream and downstream pressure tap signaling in relation to the flow coefficient of the calibrated contoured insert;
wherein
the upstream and downstream pressure tap arrangement is configured with an upstream pressure sensor; and
the contour insert comprises a base portion configured with an upstream pressure tap formed therein; and
the contour is configured with an upstream contour portion having
a flat upwardly-angled surface configured to direct a fluid flow stream towards the upstream pressure tap for sensing by the upstream pressure sensor of the upstream pressure tap arrangement and cause a dynamic upstream pressure component; and
a flat downwardly-angled lower surface configured to simultaneously direct a lower flow profile section down towards a main flow path, which helps minimize a total pressure drop, or head loss, of the flow measurement combination.

11. A flow measurement combination according to claim 10, wherein
the upstream and downstream pressure tap arrangement is configured with a downstream pressure sensor; and
the base portion is configured with a downstream pressure tap formed therein; and
the contour is configured with a downstream contour portion having a flat backside configured to maintain a static pressure zone downstream of the contoured insert.

12. A flow measurement combination according to claim 10, the base portion is configured with an upstream pressure tap and a downstream pressure tap, both formed therein.

13. A flow measurement combination according to claim 10, wherein the fluid system includes a pipe line, and the contour is specifically calibrated to the size of the pipe line.

14. A flow measurement combination according to claim 10, wherein the contour comprises an upstream curved contour portion configured with either a concave-shaped surface or convex-shaped surface.

15. A flow measurement combination according to claim 10, wherein the contoured insert and the upstream and downstream pressure tap arrangement is manufactured so as to be integral to a body of a valve or pipe.

16. A flow measurement combination according to claim 10, wherein
the base portion includes upstream and downstream pressure taps configured therein relation to the contour; and
the upstream and downstream pressure tap arrangement comprises upstream and downstream tap sensors configured to sense fluid pressure in relation to the upstream and downstream pressure taps and provide the upstream and downstream pressure tap signaling.

17. A flow measurement combination according to claim 10, wherein the contoured insert is installed in a valve or a length of piping in the fluid system.

\* \* \* \* \*